(12) United States Patent
Prack et al.

(10) Patent No.: US 8,138,239 B2
(45) Date of Patent: Mar. 20, 2012

(54) POLYMER THERMAL INTERFACE MATERIALS

(75) Inventors: Ed Prack, Phoenix, AZ (US); Yi Li, Chandler, AZ (US); Wei Wu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 12/342,322

(22) Filed: Dec. 23, 2008

(65) Prior Publication Data

US 2010/0159233 A1    Jun. 24, 2010

(51) Int. Cl.
*C08K 7/16* (2006.01)
(52) U.S. Cl. ......... 523/223; 523/200; 523/210; 523/215
(58) Field of Classification Search .................. 523/200, 523/210, 215, 223
See application file for complete search history.

(56) References Cited

U.S. PATENT DOCUMENTS

| | | | |
|---|---|---|---|
| 4,281,038 A * | 7/1981 | Ambros et al. | ............... 428/131 |
| 6,391,442 B1 | 5/2002 | Duvall et al. | |
| 2003/0234074 A1 | 12/2003 | Bhagwagar | |
| 2006/0057364 A1 | 3/2006 | Nguyen | |
| 2007/0155136 A1 | 7/2007 | Chrysler et al. | |
| 2007/0246245 A1 | 10/2007 | Dongchan et al. | |
| 2008/0023665 A1 | 1/2008 | Weiser | |

FOREIGN PATENT DOCUMENTS

| | | |
|---|---|---|
| WO | 2010/074970 A2 | 7/2010 |
| WO | 2010/074970 A3 | 9/2010 |

OTHER PUBLICATIONS

International Search Report received for PCT Patent Application No. PCT/US2009/067274, mailed on Jun. 25, 2010, 14 pages.
International Preliminary Report on Patentability received for PCT Patent Application No. PCT/US2009/067274, mailed on Jul. 7, 2011, 8 pages.

* cited by examiner

*Primary Examiner* — Edward J Cain
(74) *Attorney, Agent, or Firm* — David L. Guglielmi

(57) ABSTRACT

In some embodiments, polymer thermal interface materials are presented. In this regard, a thermal interface material is introduced comprising a polymer matrix, a matrix additive, wherein the matrix additive comprises a fluxing agent, and a spherical filler material, wherein the spherical filler material comprises a metallic core with an organic solderability preservative coating. Other embodiments are also disclosed and claimed.

12 Claims, 1 Drawing Sheet

POLYMER THERMAL INTERFACE MATERIALS

BACK GROUND OF THE INVENTION

Polymer compounds have been used as a thermal interface material (TIM) to bond, for example, an integrated circuit die with an integrated heat spreader (IHS). However, the process of curing and reliability stress on the TIM can lead to problems of delamination and reduced thermal conductivity.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE PRESENT INVENTION

Figure 1:
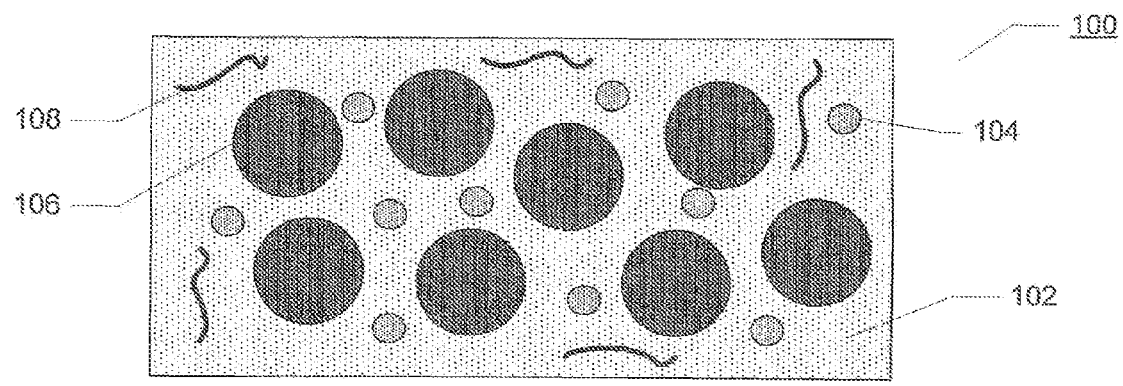
FIG. 1 represents a polymer thermal interface material according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 represents a polymer thermal interface material according to an embodiment of the present invention. As shown, TIM 100 contains polymer matrix 102, matrix additive 104, spherical filler material 106 and fibrous material 108, though the present invention is not so limited. In one embodiment, TIM 100 may not include all materials shown in FIG. 1, for example, without fibrous material 108, or may include other materials not shown.

Polymer matrix 102 may provide TIM 100 with adhesion and flexibility properties. In one embodiment, polymer matrix 102 is a silicone-based gel. In another embodiment, polymer matrix 102 is a flexible epoxy which combines the benefits of higher adhesion of epoxy and better flexibility of silicones. One example of a flexible epoxy is aliphatic polyglycol di-epoxide. In another embodiment, polymer matrix 102 is a thermoplastic such as acetal, acrylic, cellulose, acetate, polyethylene, polystyrene, vinyl, nylon or combinations thereof. In another embodiment, polymer matrix 102 is a phase change polymer such as polyolefin, polyesters, silicones, paraffins or acrylics.

Matrix additive 104 may be present to enhance the interface properties between polymer matrix 102 and spherical filler material 106 and/or allow better thermal conduction. In one embodiment, matrix additive 104 is a fluxing agent, for example short chain but low volatile carboxylic acids, amino acids, aldehyde, rosins, and polymeric acid with acid groups in backbone or in side chains. In another embodiment, matrix additive 104 is an antioxidant or thermal stabilizer to prevent the oxidation and degradation of polymer matrix 102 during heating and enhance thermal stability. Some examples of antioxidants or thermal stabilizers include Cyanox, benzoquinone, Cyasorb, 2,4,6-tri-tert-butylphenol, and Diphenylamine.

Figure 2:
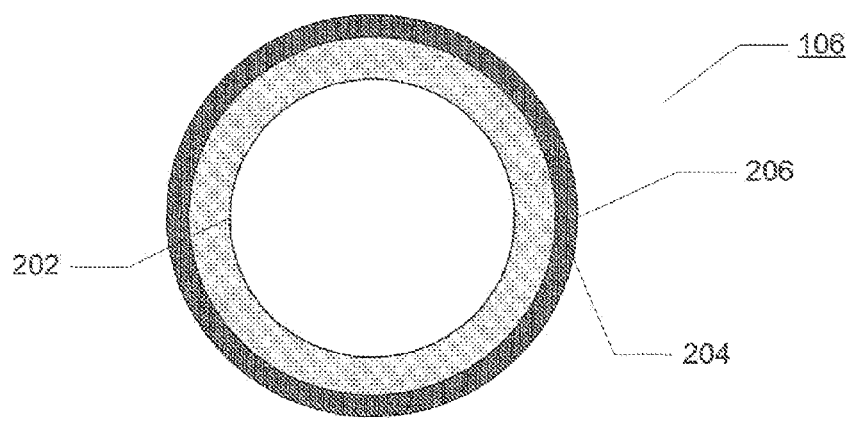
FIG. 2 represents a cross-section of a spherical filler material according to an embodiment of the present invention.

Spherical filler material 106 is designed to provide TIM 100 with enhanced thermal conductivity and may have a makeup as shown in reference to FIG. 2. While shown as having homogenous diameters, spherical filler material 106 may have varying diameters. In one embodiment, spherical filler material 106 varies in diameter from about 10 to about 30 micrometers.

Fibrous material 108 may be added to TIM 100 to allow an expandable thermal path during TIM expansion. In one embodiment, fibrous material 108 is a carbon fiber with a high L/D (length/diameter) ratio. In one embodiment, fibrous material 108 has a concentration of up to about 8% by volume of TIM 100.

FIG. 2 represents a cross-section of a spherical filler material according to an embodiment of the present invention. As shown, spherical filler material 106 may include core 202, inner shell 204 and outer shell 206, however in some embodiments, spherical filler material 106 may not include all layers shown, for example, without inner shell 204, or may include additional layers not shown.

Core 202 represents the bulk of spherical filler material 106. In one embodiment, core 202 is a solder, metal, low-melting alloy, or other highly thermally conductive material. In another embodiment, core 202 is an expanding polymer material, such as divinyl benzene crosslinked-polymer, with a relatively high coefficient of thermal expansion to provide gap filling during thermal exposure thereby allowing effective thermal contact throughout the thermal exposure range. Inner shell 204 and/or outer shell 206 may provide spherical filler material 106 with improved thermal conductivity and/or oxidation prevention. In one embodiment, where core 202 is an expanding polymer material, inner shell 204 is a conductive metal layer and outer shell 206 is a solder layer. In another embodiment, where core 202 is a thermally conductive but oxidative unstable material, such as low-melting alloy (LMA), outer shell 206 is an organic solderability preservative (OSP) coating. In one embodiment, an OSP is composed of organometallic polymer as a result of the coordination reaction between OSP active components, perhaps azole or imidazole based, and the solder atoms at the surface of core 202 (or inner shell 204).

Figure 3:
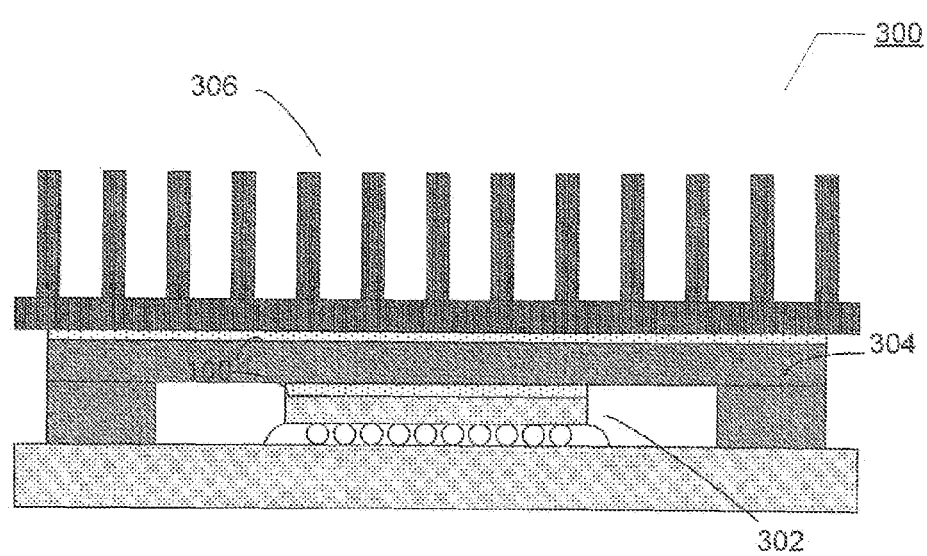
FIG. 3 represents an application of a polymer thermal interface material according to an embodiment of the present invention.

FIG. 3 represents an application of a polymer thermal interface material according to an embodiment of the present invention. Shown is package structure 300, wherein the TIM 100 may be disposed between a die 302 and a heat spreader structure 304, and also may be disposed between a heat spreader structure 304 and the heat sink structure 306. The TIM 100 may comprise any of the embodiments of the present invention. In one embodiment, the die 302 may comprise a silicon die, and the package structure 300 may comprise a ceramic package and/or an organic package structure.

Although the foregoing description has specified certain steps and materials that may be used in the method of the present invention, those skilled in the art will appreciate that many modifications and substitutions may be made. Accordingly, it is intended that all such modifications, alterations, substitutions and additions be considered to fall within the spirit and scope of the invention as defined by the appended claims. In addition, it is appreciated that certain aspects of microelectronic devices are well known in the art. Therefore, it is appreciated that the Figures provided herein illustrate only portions of an exemplary microelectronic structure that pertains to the practice of the present invention. Thus the present invention is not limited to the structures described herein.

What is claimed is:

1. A thermal interface material (TIM) comprising:
  a polymer matrix;
  a matrix additive, wherein the matrix additive comprises a fluxing agent; and
  a spherical filler material, wherein the spherical filler material comprises an expanding polymer core with a metallic inner shell and a solder outer shell.

2. The thermal interface material of claim 1 further comprising carbon fiber material.

3. The thermal interface material of claim 1 wherein the polymer matrix comprises a flexible epoxy.

4. The thermal interface material of claim 1 wherein the polymer matrix comprises a thermoplastic.

5. The thermal interface material of claim 1 wherein the polymer matrix comprises a phase change polymer.

6. The thermal interface material of claim 1 further comprising wherein the TIM is disposed between a die and a heat sink structure.

7. A thermal interface material (TIM) comprising:
  a polymer matrix;
  a matrix additive, wherein the matrix additive comprises an antioxidant; and
  a spherical filler material, wherein the spherical filler material comprises an expanding polymer core with a metallic inner shell and a solder outer shell.

8. The thermal interface material of claim 7 further comprising carbon fiber material.

9. The thermal interface material of claim 7 wherein the polymer matrix comprises a flexible epoxy.

10. The thermal interface material of claim 7 wherein the polymer matrix comprises a thermoplastic.

11. The thermal interface material of claim 7 wherein the polymer matrix comprises a phase change polymer.

12. The thermal interface material of claim 7 further comprising wherein the TIM is disposed between a die and a heat sink structure.

* * * * *